Patented Oct. 23, 1951

2,572,575

UNITED STATES PATENT OFFICE 2,572,575

PREPARATION OF TEREPHTHALIC ACID

Theodore C. Shafer and Raymond I. Longley, Jr., Dayton, Ohio, assignors to Monsanto Chemical Company, St. Louis, Mo., a corporation of Delaware No Drawing. Application September 23, 1949, Serial No. 117,494

3 Claims. (Cl. 260—525)

This invention relates to a method of preparing pure terephthalic acid from impure mixtures as obtained by the oxidation of para-xylene. More specifically the invention relates to a method of separating terephthalic acid from para-toluic acid, the principal impurity in oxidized para-xylene mixtures.

Terephthalic acid and para-toluic acid are exceedingly difficult to separate because of their similarity with respect to chemical and physical properties. Their high boiling points and slight solubility make physical separations difficult. Chemical methods of separation have not been effective, principally for economic reasons.

The primary purpose of this invention is to provide a method of preparing pure terephthalic acid. A further purpose of this invention is to provide a method of separating terephthalic acid from para-toluic acid. A still further purpose of this invention is to provide a means of separating the oxidation products of para-xylene.

It has now been found that substantially complete separations of terephthalic acid and para-toluic acid may be effected by washing with water at temperatures in excess of 95° C. Preferred practice involves the use of water at temperatures between 100° C. and 200° C., at pressures necessary to maintain the water in liquid form. The separation can be accomplished by stirring the impure acid with water in a closed retort, heating to the desired temperature and filtering the resulting mixture while maintaining the temperature within the critical range. The effectiveness of the separation will depend upon the quantity of water mixed with the impure terephthalic acid. Optimum practice involves the washing of the filter cake with one or more portions of water at the critical temperature, and reprecipitating the acid after dissolution in caustic and by acidifying the resulting solution. In this manner substantially complete separations of terephthalic and para-toluic acids may be accomplished.

Further details of the practice of this invention are set forth with respect to the following examples.

Example 1

One hundred grams of an impure terephthalic acid containing 6.7 percent of para-toluic acid were placed in an autoclave with 2000 cc. of water. The mixture was stirred for one-half hour at 175° C. at a pressure of 100 pounds per square inch gauge and forced through a filter into a pressurized receiver, the pressure differential between the autoclave and the receiver being 15 to 20 pounds per square inch. Upon reprecipitation after dissolution in caustic soda a substantially pure terephthalic acid was obtained.

Example 2

The procedure described in the preceding example was repeated except that the charge contained 11.6 percent of para-toluic acid and a pressure of 200 pounds per square inch gauge was used. An analysis of the filter cake showed a negligible quantity of para-toluic acid.

Example 3

The procedure of Example 1 was duplicated at 100° C. and 100 pounds per square inch with a charge containing 4.2 percent of para-toluic acid and the balance terephthalic acid. No toluic acid was found to be present in the reprecipitated terephthalic acid.

Example 4

To demonstrate the effect of pressure filtration a 30 gram mixture of terephthalic acid and para-toluic acids containing 5.7 percent of para-toluic acid was extracted in a Sohxlet extractor for six hours. The average temperature of the water in contact with the acid mixture was approximately 85° C. At the conclusion of the six hour extraction period, 28.5 grams of residue remained, which was found to contain 5.6 percent of para-toluic acid. Thus, virtually no separation had been accomplished.

The invention is defined by the following claims:

1. A method of separating a mixture of terephthalic acid and para-toluic acid, which comprises contacting the mixed acids with water at a temperature between 100° C. and 200° C., and filtering the resulting slurry at a temperature between 100° C. and 200° C.

2. A method of removing para-toluic acid from impure terephthalic acid, which comprises contacting the impure terephthalic acid with water at superatmospheric pressure at a temperature between 100° C. and 200° C., and filtering the resulting slurry under superatmospheric pressure at a temperature between 100° C. and 200° C.

3. A method of removing para-toluic acid from impure terephthalic acid, which comprises contacting the impure terephthalic acid with water at superatmospheric pressure at a temperature between 100° C. and 200° C., filtering the resulting slurry under superatmospheric pressure at a temperature between 100° C. and 200° C., and reprecipitating the terephthalic acid from caustic solution.

THEODORE C. SHAFER.
RAYMOND I. LONGLEY, JR.

REFERENCES CITED

The following references are of record in the file of this patent:

UNITED STATES PATENTS

| Number | Name | Date |
|---|---|---|
| 2,245,528 | Loder | June 10, 1941 |
| 2,302,462 | Palmer et al. | Nov. 17, 1942 |
| 2,479,067 | Gresham | Aug. 16, 1949 |

FOREIGN PATENTS

| Number | Country | Date |
|---|---|---|
| 364,442 | Germany | Nov. 25, 1922 |

OTHER REFERENCES

Fieser et al.: "Organic Chemistry" (Heath), pages 674–675 (1944).

Heilbron: "Dict. of Org. Compounds" (Oxford), vol. 3, page 777 (1938).

MacArdle: "Solvents in Synthetic Org. Chem." (Van Nostrand), page 21 (1925).

Handbook of Chem. and Physics (Chem. Rubber Co.), 26th ed., pages 1034–1035 (1942).